(12) United States Patent
Sampou

(10) Patent No.: US 11,541,822 B2
(45) Date of Patent: Jan. 3, 2023

(54) VEHICLE ROOF STORAGE DEVICE

(71) Applicant: Michael Sampou, Merrimac, MA (US)

(72) Inventor: Michael Sampou, Merrimac, MA (US)

( * ) Notice: Subject to any disclaimer, the term of this patent is extended or adjusted under 35 U.S.C. 154(b) by 56 days.

(21) Appl. No.: 17/011,523

(22) Filed: Sep. 3, 2020

(65) Prior Publication Data

US 2022/0063506 A1  Mar. 3, 2022

(51) Int. Cl.
*B60R 9/042* (2006.01)
*B60R 9/12* (2006.01)
*B60R 9/10* (2006.01)

(52) U.S. Cl.
CPC ............ *B60R 9/0426* (2013.01); *B60R 9/042* (2013.01); *B60R 9/10* (2013.01); *B60R 9/12* (2013.01)

(58) Field of Classification Search
CPC ...... B60R 9/042; B60R 9/0423; B60R 9/0426
See application file for complete search history.

(56) References Cited

U.S. PATENT DOCUMENTS

| | | | |
|---|---|---|---|
| 3,623,642 A | 11/1971 | Stephen | |
| 4,003,485 A * | 1/1977 | Edgerton | B60R 9/042 |
| | | | 224/310 |
| 4,955,519 A | 9/1990 | Forrester | |
| 5,377,886 A | 1/1995 | Sickler | |
| 5,421,495 A | 6/1995 | Bubik | |
| 5,476,202 A | 12/1995 | Lipp | |
| 5,535,929 A * | 7/1996 | Neill | B60R 9/042 |
| | | | 224/310 |
| 5,593,076 A | 1/1997 | Biondo | |
| 5,605,321 A | 2/1997 | Jarvis | |
| 5,641,108 A | 6/1997 | Ewer | |
| 5,782,391 A | 7/1998 | Cretcher | |
| 5,950,890 A | 9/1999 | Darby | |
| 6,010,049 A | 1/2000 | Stein | |
| 6,015,074 A * | 1/2000 | Snavely | B60R 9/042 |
| | | | 224/310 |
| 6,237,824 B1 | 5/2001 | Bagley | |
| 6,357,548 B1 * | 3/2002 | Boyd | B60R 9/0423 |
| | | | 182/127 |
| 6,428,263 B1 * | 8/2002 | Schellens | B60R 9/042 |
| | | | 224/310 |
| 6,662,983 B2 | 12/2003 | Lane | |
| 7,226,266 B2 | 6/2007 | Henderson | |
| 8,267,293 B2 | 9/2012 | Liu | |
| 9,371,040 B2 | 6/2016 | Townsend | |
| 9,649,988 B2 * | 5/2017 | Magnusson | B60R 9/12 |
| 10,029,598 B2 * | 7/2018 | Keck | B60R 9/06 |
| 10,780,837 B2 * | 9/2020 | Sautter | B60R 9/045 |
| 10,800,339 B2 * | 10/2020 | Anderson | B60R 9/055 |

(Continued)

FOREIGN PATENT DOCUMENTS

DE  29507829 U1 *  10/1995
DE  19535918      2/1996

(Continued)

*Primary Examiner* — Scott T McNurlen
(74) *Attorney, Agent, or Firm* — Lambert Shorten & Connaughton; David J. Connaughton, Jr.; Justin P. Tinger

(57) ABSTRACT

A vehicle roof storage device is provided. The device is formed of a body and a slider rack. The slider rack is moveable between a stowed position for driving, and an extended position angled downward and contacting the ground. In the extended position, a user can easily load and unload the device without having to lift items overhead to load on the vehicle.

19 Claims, 4 Drawing Sheets

(56) References Cited

U.S. PATENT DOCUMENTS

2007/0029361 A1    2/2007   Oktay
2011/0309120 A1   12/2011   Noonan

FOREIGN PATENT DOCUMENTS

| EP | 1127745 | | | 8/2001 |
|----|---------|---|---|--------|
| FR | 3022197 | | | 12/2015 |
| GB | 2468660 | | | 9/2010 |
| JP | 11192895 | A | * | 7/1999 |
| WO | 9514602 | | | 6/1995 |
| WO | 2006004853 | | | 1/2006 |
| WO | 2006013434 | | | 2/2006 |
| WO | 2017029204 | | | 2/2017 |

* cited by examiner

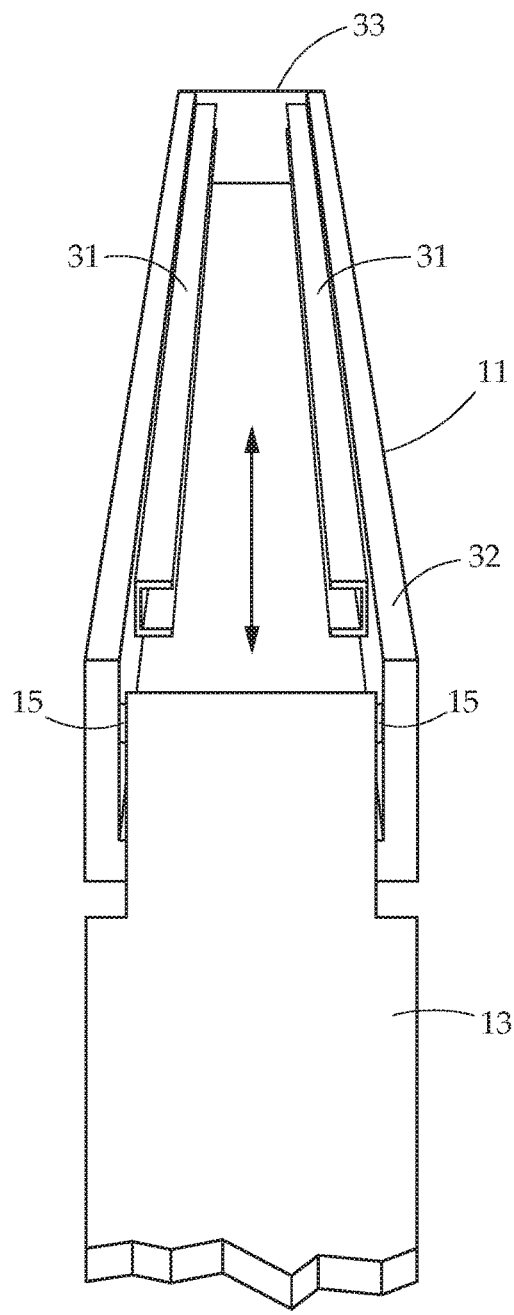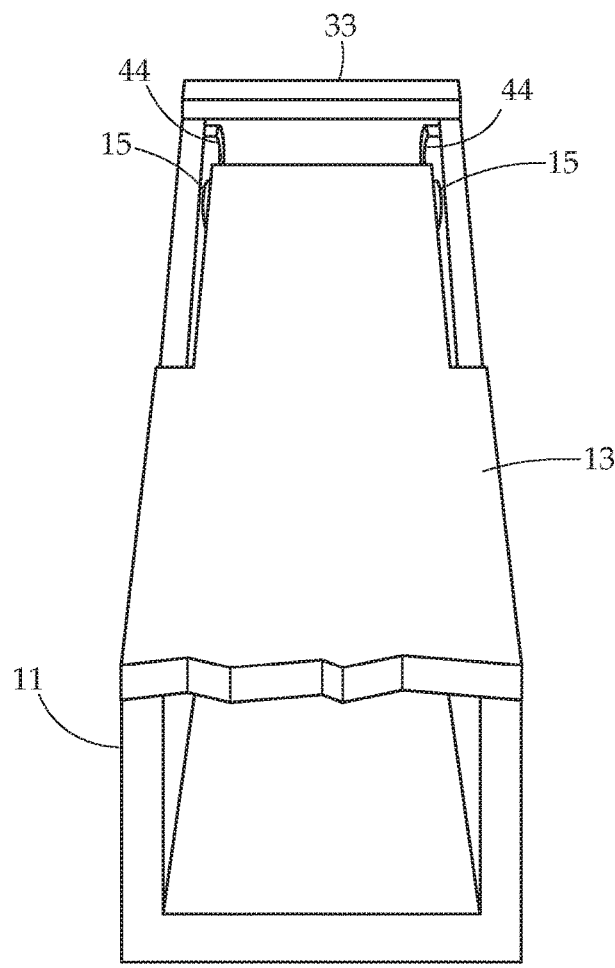
Fig. 3
Fig. 4

VEHICLE ROOF STORAGE DEVICE

BACKGROUND

Technical Field

The present disclosure relates generally to vehicle roof storage devices. More particularly the present disclosure relates to a vehicle roof storage device which allows easy and effective removal of items thereon.

Description of Related Art

Roof racks for additional vehicle storage are common ways to add additional capacity to a vehicle. Often these roof racks include bicycle racks, ski racks, boat racks, and cargo boxes/racks. Placing these items on the roof allows for a convenient way to store these large items. However, all of the presently existing roof racks require that the user load and unload the racks from on top of the roof, typically from a side of the vehicle. This results in a cumbersome and difficult loading and unloading experience. Also, in many instances heavy items are too heavy to lift overhead and safely into position. Therefore, many items are simply not possible for certain people to store on the roof of a vehicle.

Therefore, what is needed is a device that may allow efficient and convenient access to roof storage devices.

SUMMARY

The subject matter of this application may involve, in some cases, interrelated products, alternative solutions to a particular problem, and/or a plurality of different uses of a single system or article.

In one aspect, a vehicle roof storage device is provided. The device comprises a body connectable to a roof of a vehicle. The body has an open top defining an interior space, and a track within the interior space attached to an inside of the body. The device further comprises a slider rack which is movable between a stowed position and extended position. The stowed position having the slider rack positioned within or mostly within the body for when the roof storage rack is loaded on top of a vehicle. The extended position having a distal end of the slider rack away from the body and angled downward, while a proximal end of the slider rack remains engaged with the body. The slider rack engaged with the track when being moved between the stowed position and extended position.

In another aspect, a vehicle having a roof storage device attached is provided. The vehicle has the roof storage device attached to the roof. The roof storage device having a body which has an open top defining an interior space, and a track within the interior space attached to an inside of the body. The device further has a slider rack which is movable between a stowed position and extended position. The stowed position having the slider rack positioned within or mostly within the body for when the roof storage rack is loaded on top of a vehicle. The extended position having a distal end of the slider rack away from the body and angled downward such that the distal end of the slider rack contacts and rests on the ground, while a proximal end of the slider rack remains engaged with the body. The slider rack engaged with the track when being moved between the stowed position and extended position.

In yet another aspect, a method of storing an item on a vehicle roof is provided. The method involves attaching a roof storage device to a vehicle roof. The roof storage device having a body which has an open top defining an interior space, and a track within the interior space attached to an inside of the body. The device further has a slider rack which is movable between a stowed position and extended position via the track. Once attached, the method involves moving the slider rack to the extended position, loading the slider rack by attaching an item (such as bicycle, skis/snowboard, kayak/boat, storage rack/box, etc.) to the slider rack, and then moving the slider rack with the item thereon to the stowed position. The slider rack can then be locked into the stowed position and the vehicle may be driven.

BRIEF DESCRIPTION OF THE DRAWINGS

FIG. 3 provides a frontal view of an embodiment of the roof storage device in an extended position.

FIG. 4 provides a frontal view of an embodiment of the roof storage device in a stowed position.

DETAILED DESCRIPTION

Figure 1:
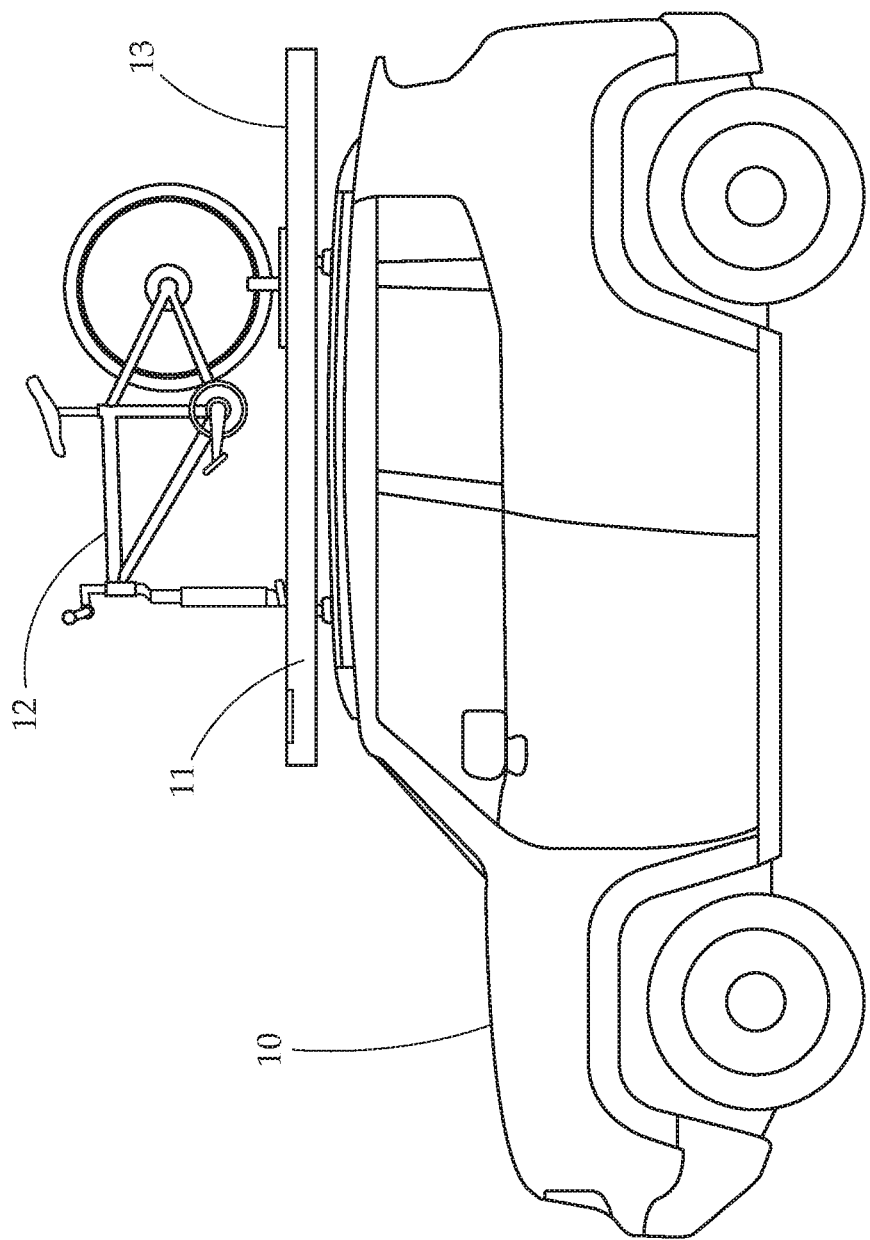
FIG. 1 provides a side view of a vehicle roof storage device of the present disclosure mounted on a vehicle in a stowed position.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a vehicle roof storage device, sometimes referred to in the art as a "roof rack." The device is operable to have a movable slider rack which can move between a stowed position held in position on a body which is mounted to the roof, and an extended position, where the slider rack is slideably extended away from the body and can angle downward to the ground at a rear of the vehicle. This allows a user to much more easily attach an item to the storage device, and then easily guide the slider rack having the item secured thereon in sliding fashion up to the top of the vehicle.

Generally, the body of the vehicle roof storage device is formed as an elongate shape configured to be attached lengthwise to a vehicle roof. The body typically is formed having an open top, and a bottom capable of attachment to a vehicle. The body is formed of materials sufficiently rigid and resilient enough to withstand forces applied to an item on the roof of a vehicle at driving speeds such as wind, bumps, and so on. The body may attach directly to the vehicle in one embodiment. In another embodiment, the body may attach to an existing roof cross bar or bars using, for example, clamps, straps and the like. In some embodiments, a front of the body may have a tapered or otherwise aerodynamic leading face, to reduce drag and increase fuel efficiency.

A slider rack is attachable to the body and operates to receive items for storage in the vehicle roof storage device, and also operates to slide between a stowed and extended position to allow for ease of loading and unloading. The slider rack may be removably connectable to the body. Adapter components to hold specific types of items may be permanently or removably attached to the slider rack. Items attachable to the slider rack may include typical roof-stored items such as bicycles, skis and snowboards, kayaks and other boats, storage compartments and racks, among other options. For example, in a bicycle embodiment, the slider rack may have a front and rear clamp to receive the fork or wheel of the bicycle at the front, and a rear wheel of the bicycle. In a ski rack embodiment, cross bars and clamps may be used to hold the skis to the slider rack. Many common roof rack adapter components either existing or to be invented may be used in combination with the slider rack, adding to the device's universal applicability and versatility. In another embodiment, the slider rack may have universal mounts to hold a wide variety of items. In further embodiments, the slider rack may have adapter mounts to receive existing roof storage systems such as those currently on the market which in turn can be used to hold items to the storage device. In certain embodiments, the distal end of the slider rack, which contacts the ground in an extended position, may have a reinforced plate at its end, to protect the slider rack from damage from ground contact.

One or more locks or other safety features may be employed to secure the slider rack in the stowed position. These may include pins engaging with both slider rack and body, locks engaging with both slider rack and body, blocking plates, blocking pins and the like preventing movement of the slider rack relative to the body. Other safety features may include portions of the track engaged with the slider rack which prevent unintended movement. In one embodiment, a pin may pass through an aperture in both the body and slider rack, holding them in position relative to each other. In another embodiment, a pin attached to one of the body or the slider rack may pass through an aperture in the other of the body or the slider rack, holding them in position relative to each other.

In use, a user may move the slider rack to the extended position, load the item(s) to be stored, and then return the slider rack to its stowed position. In one embodiment, the slider rack is lifted up, pivoting until parallel with the body. Once parallel, the slider rack can be pushed forward to engage tracks which guide its further forward movement, until the proximal end of the slider rack is close to the proximal end of the body.

Another safety feature includes preventing a forward pivoting of the slider rack about its proximal end relative to a proximal end of the body, which would cause the slider rack to rotate forward over the hood of the car. Multiple solutions to prevent this may be employed, and in some embodiments, redundancy serves to ensure safety. For example, the slider rack may have a protrusion at its distal end to engage with the body, holding the two in place relative to each other. A lock or other engagement between the body and slider rack may be employed. In another embodiment, a portion of the proximal end of the slider rack may extend over the proximal end of the body.

In one embodiment, movement of the slider rack to the stowed position, and sometimes from the stowed, may be force-aided. For example a motor may operate to automatically control the movement of the slider rack. In another embodiment, springs, weights, pistons, and the like may be positioned so as to be tensioned or loaded when a user draws the slider rack from the stowed to extended position. Then, when the slider rack is pivoted to be parallel with the body and urged forward, the urging may be aided by the loaded spring, weight, piston, etc. This structure may also prevent uncontrolled movement by gravity of the slider rack moving from the stowed to extended position.

Turning now to FIG. 1 a vehicle having the roof storage device mounted thereon is shown. The vehicle 10 has roof cross bars on which the roof storage device is attached. In other embodiments, the roof storage device may attach directly to the vehicle roof and/or door openings. The roof storage device is formed of a body 11 and a slider rack 13. The body 11 is an elongate shape and is positioned to have its length in the same direction as a length of the vehicle 10. In this view, the slider rack 13 is in its stowed position being substantially contained within the body 11 and secured in place for driving. A bicycle 12 is attached to the slider rack via rear wheel clamp 17 and front fork clamp 16. Of course, other connection structures such as straps, tie downs, hooks, and the like may be employed without straying from the scope of this invention. The slider rack 13 is slideably movable between the stowed position as shown, and an extended position which has the distal end of the slider rack 13 positioned away and downward from the body 11, while the proximal end of the slider rack 13 remains engaged with the body. The extended position of the slider rack is shown in FIG. 2.

Figure 2:
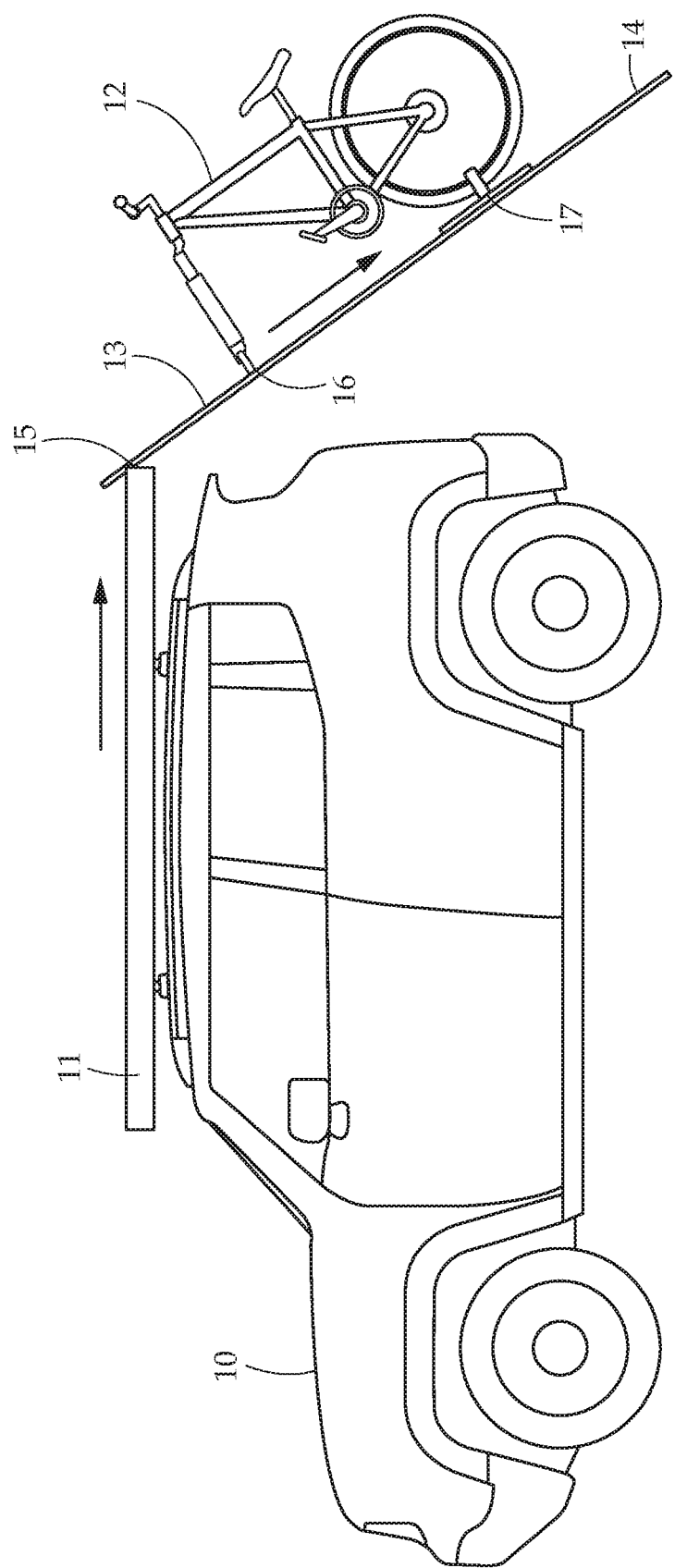
FIG. 2 provides a side view of a vehicle roof storage device of the present disclosure mounted on a vehicle in an extended position.

FIG. 2 shows another embodiment of the vehicle roof storage device with the slider rack in the extended position. The vehicle 10 has roof cross bars on which the body 11 of the roof storage device is attached. Bicycle 12 is attached to the slider rack via rear wheel clamp 17 and front fork clamp 16. The slider rack 13 has been slid outwardly in the direction of arrow parallel to the body 11 until it is extended far enough away from the body that it reaches a stop or other structure which allows it to pivot downward as shown in the downwardly angled arrow. The distal end 14 of the slider rack is positioned away from the body 11 and the slider rack 13 is angled downward such that the distal end 14 contacts the ground at a rear of the vehicle. In other embodiments, the outward sliding and angling may be done concurrently, meaning that the slider rack 13 need not be drawn out parallel and then angled downward. In certain embodiments, the slider rack 13 may have resistance to movement preventing it from sliding uncontrolled to the extended position. Resistance may be applied by springs, frictional engagement between slider rack and body, pistons, gears, counterweights, and the like, to prevent rapid movement of the slider rack 13. In some cases, the same structures may aid movement from the extended position to the stowed position. The proximal end 15 of the slider rack 13 remains engaged with the body 11. When the user wishes to return the slider rack 13 to the stowed position, the distal end 14 is lifted upward and towards the body 11 until the slider rack 13 returns to the stowed position.

Figure 5:
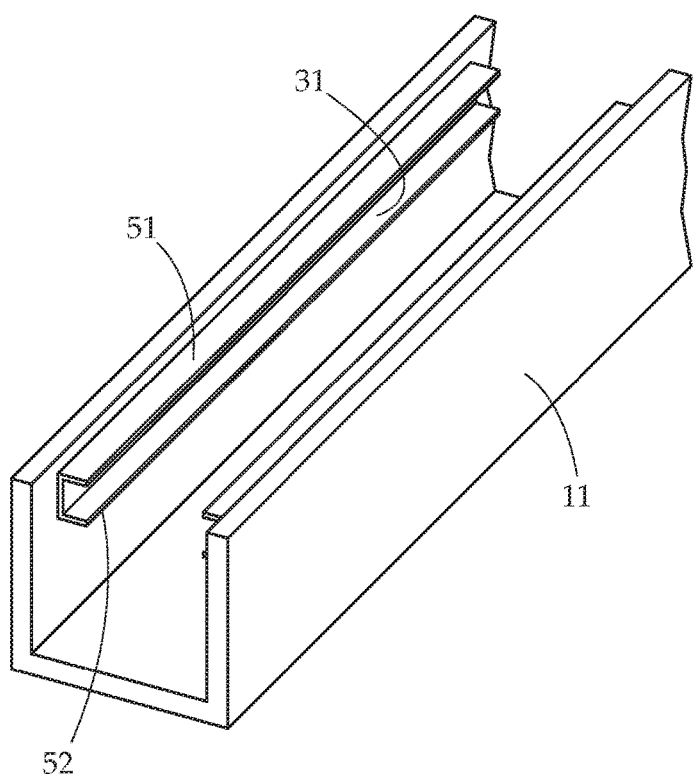
FIG. 5 provides a perspective view of a body of the roof storage device.

FIG. 3-5 show perspective views of a top of the body and slider rack. FIG. 3 shows a track 31 into which a protrusion 15 of the slider rack 13 may engage. A perspective side view of this track 31 is seen in FIG. 5. The track 31 is defined in this view as a channel having a top wall 51 and bottom wall 52 with the channel defined therebetween. The body 11 is generally formed having an open top, a rear wall 33 and sidewalls 32.

A track 31 is attached to the inside of the body 11, and a protrusion 15 of the slider rack 13 is engagable with the track 31. The protrusion 15 may be a wheel, pin, or any other structure capable of engaging with track 31 and moving thereon. In this view, the track 31 does not extend all the way to the distal end 32 of the body 11. Rather, once the protrusion 15 extends past the track 31 it is free to allow pivoting of the slider rack 13 downward to contact the ground. In this position, the protrusion 15 is held in a separate groove or recession in the body 11. The groove or recession can have guides to direct the protrusion 15 back into engagement with the track 31 as the user lifts and pushes the slider rack 13 back to the stowed position. A similar construction may be employed at the proximal end of the body 11 where the track 31 does not extend all the way to the end of the body. The protrusion 15 may disengage when in the stowed position and be in a more secure locked position to prevent movement of the slider rack 13 to the extended position. In the extended and stowed positions, certain motions of the slider rack may re-engage the protrusions with the track, such as a forward, rearward, upward, or downward movement of the distal end of the slider rack. In other embodiments, the track 31 may extend to one or both ends of the body.

In this particular view, the slider rack has a narrowed portion at its proximal end, and a wider portion on some or the remainder of its length. This wider portion rests on top of the side walls 32 when the slider rack 13 is in the stowed position and as it is moving to the extended position. In combination with the protrusions 15 which engage with track below the top surface of the side walls 32, the slider rack 13 is prevented from pivoting downwardly relative to the body 11 until the wider portion passes over the body 11 and only the narrow portion is engaged with the body 11. This structure also acts as a safety feature to prevent gravity from causing the slider rack to slide downwardly and away at the same time. A similar embodiment having the track extending to an end of the body and/or having a wall/blocker to prevent protrusion 15 from leaving the track 31 may also be employed without straying from the scope of this invention.

FIG. 4 shows an embodiment of the slider rack in a stowed position. In this embodiment, the track 31 has a hook-shaped proximal end which allows for a locking and secured configuration. In this embodiment, the slider rack 13 must be urged forward so that protrusion 15 engages with the hooked portion 44 of the track 31. Once engaged, the hooked portion 44 directs the protrusions and thus the rack downward and into the flat part of the track for outward movement to the extended position.

Figure 6:
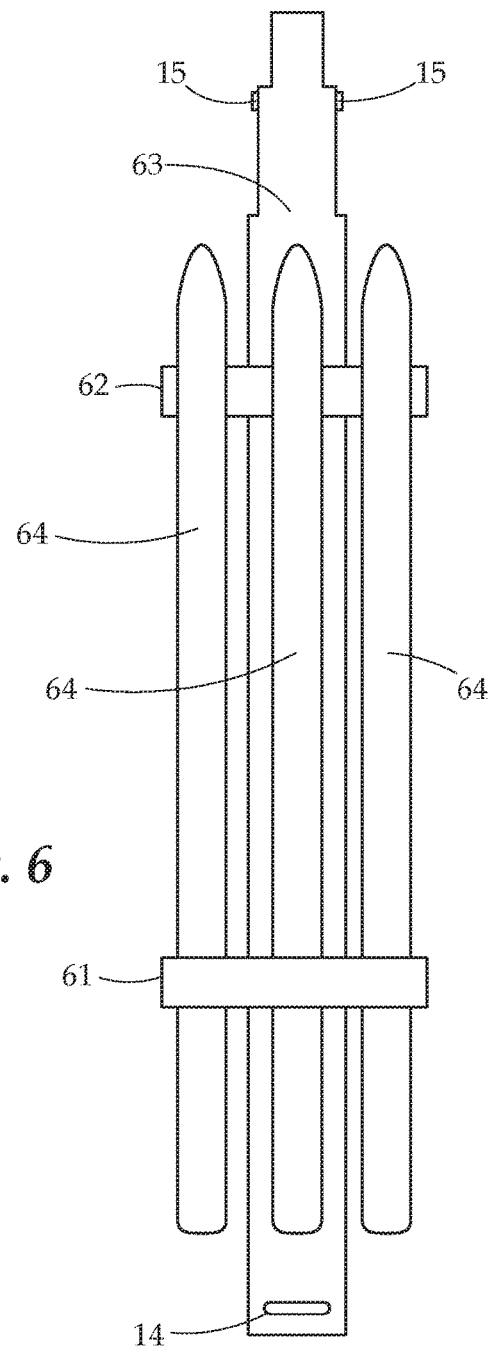
FIG. 6 provides an elevation view of a ski rack embodiment of the roof storage device.

FIG. 6 shows an elevation view of an embodiment of the slider rack having a ski rack attached thereto. In this view, the slider rack 13 has a narrow portion at its proximal end, a middle width portion having protrusions 15 extending therefrom, and a wide portion 63 extending therefrom to the distal end of the slider rack 13. The distal end of the slider rack 13 has a handle 14 for easy handling by a user. Skis 64 are held to the slider rack 13 by a rear clamp 61 and front bar 62. Of course, other configurations such as straps, tie downs, and the like may be used to hold the skis in place without straying from the scope of this invention.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A vehicle roof storage device comprising:
    a body connectable to a roof of a vehicle, the body having an open top defining an interior space, and a track within the interior space attached to the body, wherein the track is neither a groove nor a recession in the body;
    a slider rack, wherein the slider rack is movable between a stowed position for when the roof storage rack is loaded and an extended position for loading and unloading the slider rack, such that a proximal end of the slider rack is engaged with the body and a distal end of the slider rack is positioned away from the body and angled downward from the body;
    wherein the slider rack engages with the track when moving between the stowed position and the extended position;
    wherein the track is spaced apart from a front edge of the body, and spaced apart from a rear edge of the body, the slider rack comprising a protrusion, the protrusion disengaging from the track by being positioned between the track and the front edge of the body when in the stowed position, a motion of the slider rack engaging the protrusion with the track; and the protrusion disengaging from the track by being positioned between the track and rear edge of the body when in the extended position, a second motion of the slider rack engaging the protrusion with the track when moving from the extended position.

2. The vehicle roof storage device of claim 1 wherein the track is defined as a channel, the slider rack having one of a protrusion or wheels engaged with the channel.

3. The vehicle roof storage device of claim 1 wherein the slider rack comprises a bracket assembly configured to receive a bicycle.

4. The vehicle roof storage device of claim 1 wherein the slider rack comprises a cross bar and clamp configured to securely hold at least one of a snowboard and a set of skis.

5. The vehicle roof storage device of claim 1 wherein the slider rack comprises a handle at a distal end.

6. The vehicle roof storage device of claim 1 wherein the distal end of the slider rack comprises a reinforced plate positioned to contact a ground when the slider rack is in the extended position.

7. The vehicle roof storage device of claim 1 further comprising a lock operable to lock the slider rack in place when in the stowed position.

8. The vehicle roof storage device of claim 1 further comprising a plurality of clamps operable to connect to a roof cross bar of a vehicle.

9. The vehicle roof storage device of claim 1 wherein the slider rack is removable from the body.

10. The vehicle roof storage device of claim 1 further comprising a motor operable to move the slider rack between the stowed and extended position.

11. The vehicle roof storage device of claim 1 wherein the track defines a hook-shaped path at a proximal end, such that a protrusion of the slider rack engaged with the track is guided along this hook shape and held in position at a distal end of the hook shape.

12. The vehicle roof storage device of claim 1 further comprising a pin removably connectable to both the slider rack and body, the pin operable to lock the slider rack in position relative to the body.

13. The vehicle of claim 1 wherein the slider rack comprises a narrow portion by a proximal end of the slider rack and a wider portion, the wider portion resting on a top of the body in the stowed position.

14. A vehicle roof storage device comprising:
    a body connectable to a roof of a vehicle, the body having an open top defining an interior space, and a track within the interior space attached to the body;

a slider rack, wherein the slider rack is movable between a stowed position for when the roof storage rack is loaded and an extended position for loading and unloading the slider rack, such that a proximal end of the slider rack is engaged with the body and a distal end of the slider rack is positioned away from the body and angled downward from the body;

wherein the slider rack engages with the track when moving between the stowed position and the extended position;

wherein the slider rack comprises a narrow portion by a proximal end of the slider rack and a wider portion, the wider portion resting on a top of the body in the stowed position.

15. A vehicle comprising a roof storage device attached to a roof of the vehicle comprising:

the roof storage device comprising:

a body attached to the roof of the vehicle having an open top defining an interior space, the body having a track within the interior space attached to the body;

a slider rack, wherein the slider rack is movable between a stowed position for when the roof storage rack is loaded and an extended position for loading and unloading the slider rack, such that a proximal end of the slider rack is engaged with the body and a distal end of the slider rack is positioned away from the body and angled downward from the body such that the distal end rests on a surface which the vehicle is on;

wherein the slider rack engages with the track when moving between the stowed position and the extended position;

wherein the slider rack comprises a narrow portion by a proximal end of the slider rack and a wider portion, the wider portion resting on a top of the body in the stowed position.

16. The vehicle of claim 15 wherein the track is defined as a channel, the slider rack having one of a protrusion or wheels engaged with the channel.

17. The vehicle of claim 15 wherein the track is spaced apart from a front edge of the body, and spaced apart from a rear edge of the body, the slider rack comprising a protrusion, the protrusion disengaging from the track by being positioned between the track and the front edge of the body when in the stowed position, a motion of the slider rack engaging the protrusion with the track; and the protrusion disengaging from the track by being positioned between the track and rear edge of the body when in the extended position, a second motion of the slider rack engaging the protrusion with the track when moving from the extended position.

18. The vehicle of claim 15 wherein the track defines a hook-shaped path at a proximal end, such that a protrusion of the slider rack engaged with the track is guided along this hook shape and held in position at a distal end of the hook shape.

19. A method of storing an item on a vehicle roof comprising:

attaching a roof storage device to a vehicle roof, the roof storage device comprising:

a body connectable to a roof of a vehicle, the body having an open top defining an interior space, and a track within the interior space attached to the body;

a slider rack, wherein the slider rack is movable between a stowed position for when the roof storage rack is loaded and an extended position for loading and unloading the slider rack, such that a proximal end of the slider rack is engaged with the body and a distal end of the slider rack is positioned away from the body and angled downward from the body;

wherein the slider rack engages with the track when moving between the stowed position and the extended position;

wherein the slider rack comprises a narrow portion by a proximal end of the slider rack and a wider portion, the wider portion resting on a top of the body in the stowed position;

the method further comprising:

moving the slider rack to the extended position;
attaching an item to the slider rack;
moving the slider rack to the stowed position; and
locking the slider rack in the stowed position.

* * * * *